United States Patent
Waki et al.

(10) Patent No.: US 12,124,777 B2
(45) Date of Patent: Oct. 22, 2024

(54) EQUIPMENT STATE DETECTION DEVICE, EQUIPMENT STATE DETECTION METHOD, AND PROGRAM

(71) Applicant: NIPPON TELEGRAPH AND TELEPHONE CORPORATION, Tokyo (JP)

(72) Inventors: Masaki Waki, Musashino (JP); Hitoshi Niigaki, Musashino (JP); Hiroaki Tanioka, Musashino (JP); Ryoichi Kaneko, Musashino (JP); Gen Kobayashi, Musashino (JP); Kazuya Ando, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 682 days.

(21) Appl. No.: 17/413,868

(22) PCT Filed: Dec. 3, 2019

(86) PCT No.: PCT/JP2019/047194
§ 371 (c)(1),
(2) Date: Jun. 14, 2021

(87) PCT Pub. No.: WO2020/129614
PCT Pub. Date: Jun. 25, 2020

(65) Prior Publication Data
US 2022/0058307 A1 Feb. 24, 2022

(30) Foreign Application Priority Data
Dec. 17, 2018 (JP) ................. 2018-235877

(51) Int. Cl.
*G06F 30/18* (2020.01)
*G01L 5/10* (2020.01)
(Continued)

(52) U.S. Cl.
CPC ............... *G06F 30/18* (2020.01); *G01L 5/10* (2013.01); *G06T 17/05* (2013.01);
(Continued)

(58) Field of Classification Search
CPC .. G06F 30/18; G06F 2111/10; G06F 2113/16; G06F 2113/04; G06F 2119/14;
(Continued)

(56) References Cited

FOREIGN PATENT DOCUMENTS

| CN | 102721875 A | * | 10/2012 | ............. G01R 29/14 |
| CN | 103017724 A | * | 4/2013 | |

(Continued)

OTHER PUBLICATIONS

Circuit Globe, https://circuitglobe.com > calculation-of-sag-and-ten, , Jul. 2017.*
Mitsubishi Electric Corporation, Mitsubishi Mobile Mapping System High-precision GPS movement measuring device, literature, Nov. 6, 2018 (Reading Day), http://www.mitsubishielectric.co.jp/mms/.

*Primary Examiner* — Kandasamy Thangavelu

(57) ABSTRACT

An object of the present invention is to provide an equipment state detecting device, an equipment state detecting method, and a program that can create a 3D model of a cable based on three-dimensional coordinates acquired using a laser scanner or the like, and precisely estimate the tension for the entirety of the cable even if the entirety of the cable is not three-dimensionally modeled in the cable model. An equipment state detecting device of the present invention creates a 3D model of a cable based on three-dimensional coordinates acquired using a laser scanner or the like, acquires a sag and a straight line connecting ends of the 3D model based on the 3D model, and calculates the tension of the cable using a known cable load per unit length.

4 Claims, 15 Drawing Sheets

(51) Int. Cl.
*G06T 17/05*      (2011.01)
*G06F 111/10*     (2020.01)
*G06F 113/16*     (2020.01)

(52) U.S. Cl.
CPC ....... *G06F 2111/10* (2020.01); *G06F 2113/16* (2020.01); *G06T 2210/56* (2013.01)

(58) Field of Classification Search
CPC . G06F 30/17; G06F 30/13; G01L 5/10; G01L 5/047; G06T 17/05; G06T 2210/56; G06T 17/00; G01B 11/24; G01B 11/02; G01C 15/00
See application file for complete search history.

(56) References Cited

FOREIGN PATENT DOCUMENTS

| | | | |
|---|---|---|---|
| CN | 104133976 A | * | 11/2014 |
| CN | 207150033 U | * | 3/2018 |
| JP | 2006353031 A | | 12/2006 |
| JP | 2011237250 A | | 11/2011 |
| JP | 201578849 A | | 4/2015 |
| JP | 2016107843 A | | 6/2016 |
| JP | 2017156179 A | | 9/2017 |
| JP | 6428973 B1 | | 11/2018 |

* cited by examiner

|  | SPAN (m) | ACTUAL LENGTH (m) | SAG (MEASURED VALUE) (cm) | SAG (ESTIMATED VALUE) (cm) | ESTIMATED ERROR (cm) |
|---|---|---|---|---|---|
| SECTION AB | 9.803 | 9.820 | 23.530 |  |  |
| SECTION A'B' | 4.884 | 4.893 | 6.197 | 24.961 | 1.431 |
| REMAINING SECTION (AB-A'B') | 4.918 | 4.927 | 5.902 | 23.445 | 0.086 |

EQUIPMENT STATE DETECTION DEVICE, EQUIPMENT STATE DETECTION METHOD, AND PROGRAM

CROSS-REFERENCE TO RELATED APPLICATIONS

This application is a 371 U.S. National Phase of International Application No. PCT/JP2019/047194 filed on Dec. 3, 2019, which claims priority to Japanese Application No. 2018-235877 filed on Dec. 17, 2018. The entire disclosures of the above applications are incorporated herein by reference.

TECHNICAL FIELD

The present disclosure relates to technology for estimating the tension and moment that cables such as power lines or telephone lines, branch lines, and the like, which are mainly outdoors, apply to poles such as utility poles or signal posts.

BACKGROUND ART

Conventionally, a tolerable design load is set for each type of pole such as a utility pole or a signal post, and when selecting a pole, a designer estimates the maximum value of the load that is to be applied by cables and other attachments that are intended to be provided, and selects a pole having a design load that is appropriate for the estimated load. Branch lines are provided at the two ends of a group of utility poles in particular, and balance is maintained for the load applied to the group of utility poles. In such load design, the design data not only gives consideration to the state when a pole is first provided, but also give consideration to whether or not a new load may be added if an additional cable or the like is provided.

There is a Mobile Mapping System (hereinafter, MMS) in which a three-dimensional scanner (3D laser surveying instrument), a camera, a GPS device, an IMU (inertial measurement unit), and an odometer (traveling distance meter) are provided in a vehicle, outdoor structures such as surrounding buildings, roads, and bridges are comprehensively three-dimensionally surveyed while driving on a road in order to collect three-dimensional coordinates for a large number of points on the surfaces of the outdoor structures (e.g., see NPL 1). Review is underway on technology in which three-dimensional (3D) models of outdoor structures such as utility poles and cables are created based on the three-dimensional coordinates acquired using this system, and the current state and the like of such outdoor structures is three-dimensionally recreated in a PC without going to their location (e.g., see Technical Literature 1 and 2).

CITATION LIST

Patent Literature

[PTL 1] Japanese Patent Application Publication No. 2015-078849
[PTL 2] Japanese Patent Application Publication No. 2017-156179

Non Patent Literature

[NPL 1] "Mobile Mapping System: High precision GPS Mobile Measuring Equipment", [online], Mitsubishi Electric Corporation, [retrieved Jan. 25, 2017], Internet <URL: http://www.mitsubishielectric.co.jp/mms/>

SUMMARY OF THE INVENTION

Technical Problem

Poles are installed with a load design based on the maximum load value set by the designer, but tilting, bending, and the like occur as time passes. For example, if a certain utility pole becomes bent, the distance (span) between that utility pole and the utility poles installed on the two sides thereof changes. If the distance between two utility poles decreases, a cable hung between those utility poles droops (sags) to a larger extent, whereas if the distance decreases, the extent of sag decreases. The tension applied to a utility pole due to such cable sag is obtained by the following expression.

[Math. 1]

$$T = \frac{ws^2}{8d} \quad (1)$$

Here, T is the tension (kg), w is the cable load per unit length (kg/m), s is the span (m), and d is the sag (m).

Accordingly, if the amount of utility pole bending increases and the sag increases, the tension decreases, and likewise, if the sag decreases, the tension increases. Here, if the tension increases due to an increase in span and a decrease in sag, the utility pole is subjected to an unexpected excessive uneven load (unbalanced load). FIG. 1 shows calculation results for the sag d and the tension T calculated using numerical values often used in actual installation situations. It can be seen from this figure that in the region where the sag is smaller than 1 m, the horizontal tension changes by hundreds of kilograms when the sag is tens of centimeters. If the horizontal tension changes by hundreds of kilograms and the design tension of the utility pole is greatly exceeded for an extended period of time, there is a risk that cracks will form in the utility pole, and that not only the lifetime will decrease, but also the utility pole may fall over in a worst case.

However, an expert needs to take many measurements over a long period of time in order to be able to visually measure several centimeters of change in sag, span, and utility pole bending after poles and cables or the like are installed. In reality, when inspecting such equipment, an inspector actually travels to the installation sites of all poles and visually determines whether there is a danger due to the occurrence of cracks or bending caused by an unbalanced load. Accordingly, the inspector needs to be experienced, and many inspectors are required, thus requiring a very high inspection cost. In other words, a first problem is that inspection by an inspector requires experience and cost.

Also, in the case of assessing the state of a cable using a 3D model created based on three-dimensional coordinate acquired using an MMS, it is difficult for all sections of a cable having a diameter of approximately 1 cm and a length of tens of meters to be modeled three-dimensionally. One reason for this is missing portions of three-dimensional coordinates of a cable due to the resolution, oscillation period, and the like of the laser scanner provided in the MMS. In other words, a second problem is that inspection by 3D laser scanning cannot create a complete 3D model of a cable, and there are cases where tension cannot be inspected.

Furthermore, if information is supplemented (interpolated) for the missing information that could not be acquired, the precision decreases due to the influence of error and noise. In other words, a third problem is measurement precision in inspection performed by 3D laser scanning.

Accordingly, in order to solve the problems described above, an object of the present invention is to provide an equipment state detecting device, an equipment state detecting method, and a program that can create a 3D model of a cable based on three-dimensional coordinates acquired using a laser scanner or the like, and precisely estimate the tension for the entirety of the cable even if the entirety of the cable is not three-dimensionally modeled in the cable model.

Means for Solving the Problem

In order to achieve the above-described object, an equipment state detecting device according to an aspect of the present invention creates a 3D model of a cable based on three-dimensional coordinates acquiring using a laser scanner or the like, acquires a straight line that connects the ends of the cable and the sag of the cable based on the 3D model, and calculates the tension of the cable using a known cable load per unit length.

Specifically, an equipment state detecting device according to an aspect of the present invention includes: an extraction processing unit configured to receive 3D point group data including three-dimensional coordinate points that represent a surface of a cable spanning two structures, and create a 3D model of the cable using the 3D point group data; and a calculation unit configured to acquire a span indicating the length of a straight line that connects two ends of the 3D model of the cable, acquire a sag indicating a movement amount when translating the straight line until the straight line is in contact with the 3D model of the cable at one point, and calculate a tension of the cable based on the span, the sag, and a known cable load per unit length.

Also, an equipment state detecting device according to an aspect of the present invention includes: an extraction processing step of receiving 3D point group data including three-dimensional coordinate points that represent a surface of a cable spanning two structures, and creating a 3D model of the cable using the 3D point group data; and a calculating step of acquiring a span indicating the length of a straight line that connects two ends of the 3D model of the cable, acquiring a sag indicating a movement amount when translating the straight line until the straight line is in contact with the 3D model of the cable at one point, and calculating a tension of the cable based on the span, the sag, and a known cable load per unit length.

With this equipment state detecting device, three-dimensional coordinates of the cable are acquired using a laser scanner, and the current state of the cable and the like can be three-dimensionally reproduced in a PC without going to the site of the cable. Furthermore, the span and the sag of the cable can be acquired based on the three-dimensional coordinates, and therefore the tension of the cable can be calculated using Expression 1. Accordingly, the equipment state detecting device can resolve the first problem described above.

Furthermore, in the equipment state detecting device according to an aspect of the present invention, the extraction processing unit may further receive 3D point group data including three-dimensional coordinate points that represent surfaces of the structures, create 3D models of the structures using the 3D point group data, and acquire state information regarding a diameter, an inclination angle, and a bend amount for each of the structures. The equipment state detecting device can therefore estimate the state of not only a cable, but also a structure such as a utility pole.

Furthermore, in the equipment state detecting device according to an aspect of the present invention, the calculation unit may detect central coordinates in the 3D model of each of the structures, calculate a distance between the central coordinates at the same ground height, and calculate an inter-structure span by subtracting a radius of each of the structure from the calculated distance, and if the length of a 3D model of the cable is shorter than the inter-structure span, for each non-parallel 3D model of the cable, the calculation unit may calculate a sag of a complete 3D model of the cable based on the sag and a ratio of the span and the inter-structure span, obtain an average sag by averaging the sags of the complete 3D models calculated for the non-parallel 3D models of the cable, and use the average sag as the sag when calculating the tension of the cable.

With this equipment state detecting device, by using Expressions 2 and 3, it is possible to calculate the tension of the cable if a 3D model could be created for at least a portion of the cable. Accordingly, the equipment state detecting device can resolve the second problem described above.

Furthermore, the equipment state detecting device according to an aspect of the present invention may be configured such that the extraction processing unit receives the number of artificial satellites used when acquiring three-dimensional coordinates and information regarding a velocity of a measuring device during acquisition of three-dimensional coordinates along with the 3D point group data, and if at least either one of the number of artificial satellites and the velocity does not satisfy a pre-set control value, the extraction processing unit does not use the three-dimensional coordinates that did not satisfy the control value when creating the 3D model.

With this equipment state detecting device, it is possible to select and discard three-dimensional coordinates based on data such as the number of GPS satellites used and the MMS acceleration, thus making it possible to create a 3D model using only highly reliably three-dimensional coordinates. Accordingly, the equipment state detecting device can resolve the third problem described above.

Also, another aspect of the present invention is a program for causing a computer to function as the equipment state detecting device. The equipment state detecting device can be also be realized by a computer and a program, and the program can be recorded on a recording medium or provided via a network.

Effects of the Invention

The present invention provides an equipment state detecting device, an equipment state detecting method, and a program that can create a 3D model of a cable based on three-dimensional coordinates acquired using a laser scanner or the like, and precisely estimate the tension for the entirety of the cable even if the entirety of the cable is not three-dimensionally modeled in the cable model.

DESCRIPTION OF EMBODIMENTS

The following describes embodiments of the present invention with reference to the accompanying drawings. The embodiments described below are examples of embodiments of the present invention, and the present invention is not limited to the following embodiments. Note that like constituent elements in this specification and the drawings are indicated by like reference numbers.

First Embodiment

Figure 1:
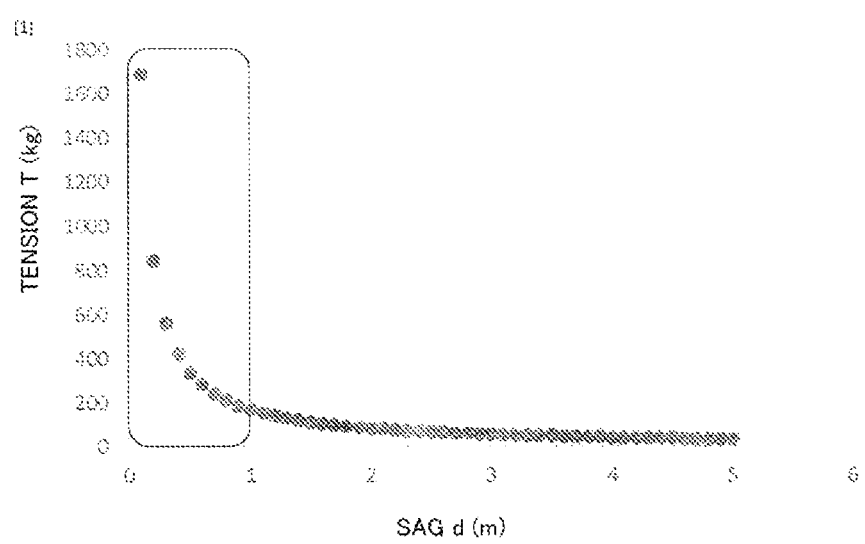
FIG. 1 is a graph showing a relationship between sag and tension.
Figure 2:
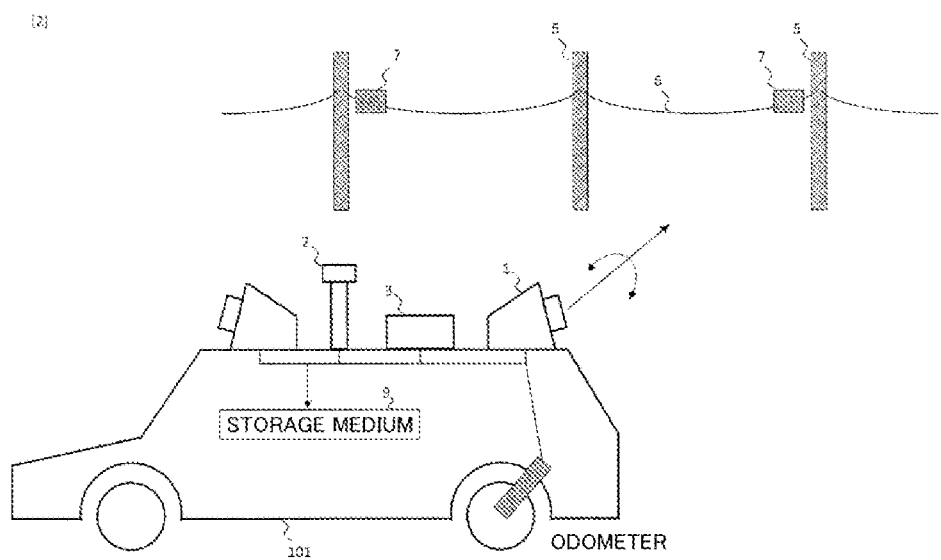
FIG. 2 is a diagram illustrating a technique for detecting an equipment state using an MMS.
Figure 3:
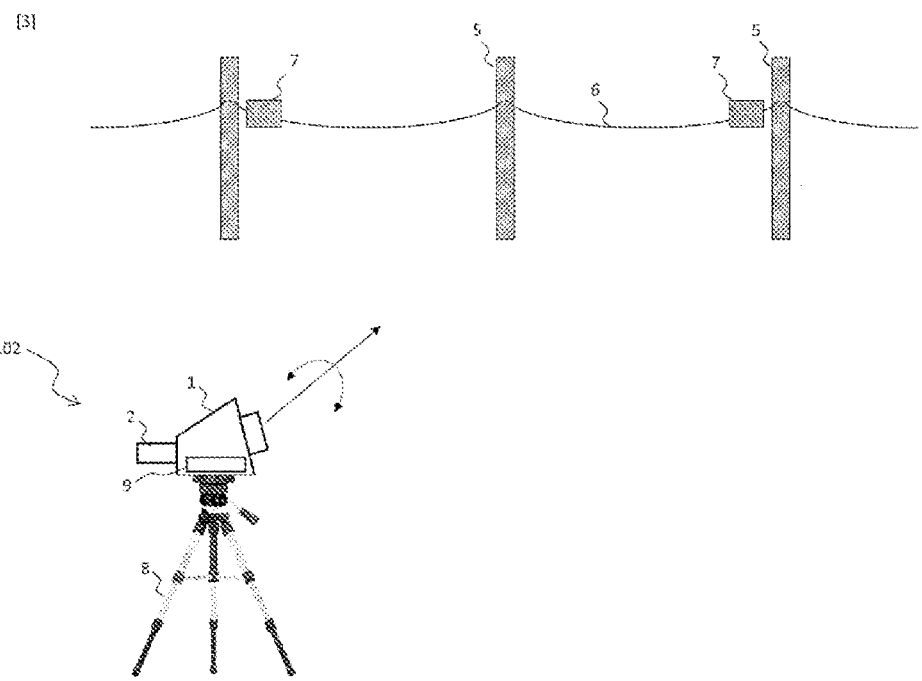
FIG. 3 is a diagram illustrating a technique for detecting an equipment state using a fixed laser scanner.

FIG. 2 is a diagram illustrating an MMS 101, which is a device that collects information for use when carrying out the equipment state detecting method of the present embodiment. The MMS 101 includes a 3D laser scanner 1, a GPS 2, an IMU 3, and a storage medium 9 that are mounted on/in a vehicle. The MMS 101 uses the 3D laser scanner 1, the GPS 2, and the IMU 3 to take 3D measurements of surrounding structures while the vehicle travels, and stores the acquired data in the storage medium 9. Specifically, the MMS 101 acquires point group data including 3D (XYZ) coordinates of outdoor structures such as utility poles (poles) 5, power lines (cables) 6, and closures 7, and also acquires image data showing such outdoor structures. Also, as shown in FIG. 3, point group data and image data can be acquired by not only a mobile MMS, but also by a fixed laser scanner 102 that includes the laser scanner 1 and the GPS 2 on a tripod 8.

Figure 4:
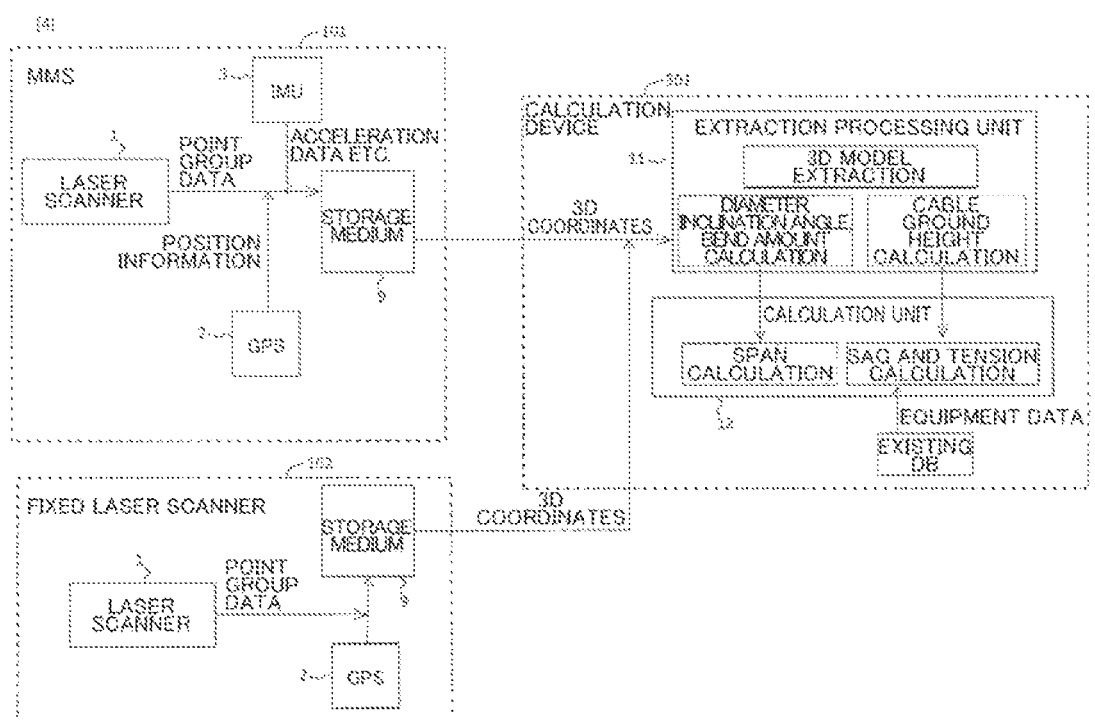
FIG. 4 is a block diagram illustrating an equipment state detecting device according to the present invention.

FIG. 4 is a block diagram illustrating an equipment state detecting device 301 according to the present embodiment. The equipment state detecting device 301 includes an extraction processing unit 11 and a calculation unit 12. Here, the extraction processing unit 11 receives an input of 3D point group data in which the surface of a cable that spans two structures is represented by three-dimensional coordinate points, and uses the 3D point group data to create a 3D model of the cable. The calculation unit 12 acquires a span S', which is the length of a straight line that connects the two ends of the 3D model of the cable, and a sag, which is the movement amount when translating the straight line until it comes into contact with the 3D model of the cable at one point, and calculates the tension of the cable based on the span S', the sag, and a known cable load per unit length.

The extraction processing unit 11 also receives an input of 3D point group data in which the surfaces of the structures are represented by three-dimensional coordinate points, creates 3D models of the structures as well using the 3D point group data, and acquires state information including the diameters, inclination angles, and bend amounts of the structures.

3D distance data regarding distances to outdoor structures, vehicle position coordinates, and vehicle acceleration data are also obtained from the 3D laser scanner 1, the GPS 2, and the IMU 3 of the MMS 101, and such data is also input to the storage medium 9 along with the point group data and the image data. Similarly, 3D distance data regarding distances to outdoor structures and the position coordinates of the fixed laser scanner 102 are obtained from the 3D laser scanner 1 and the GPS 2 provided therein, and such data is also input to the storage medium 9 along with the point group data and the image data.

The extraction processing unit 11 creates 3D models (hereinafter called 3D model data) based on the point group data and the like stored in the storage medium 9. Additionally, the extraction processing unit 11 uses coordinate information in the 3D model to calculate the diameter, the inclination angle, and the bend amount of a pole, and calculate the minimum ground height of a cable. The calculation unit 12 references the diameter, bend amount, and inclination angle of the pole and the cable ground height, calculates a span based on the 3D models of multiple poles, and calculates a sag and a tension based on the end points of the cable.

Figure 5:
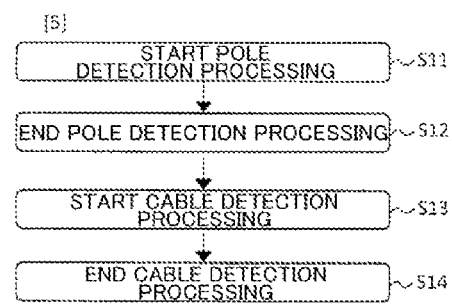
FIG. 5 is a flowchart illustrating 3D model extraction processing performed by an extraction processing unit of the equipment state detecting device according to the present invention.

FIG. 5 is a flowchart illustrating structure 3D model extraction processing performed by the extraction processing unit 11. The extraction processing unit 11 uses the technique described in PTL 1 for example to create 3D models of utility poles and power lines.

Figure 6:
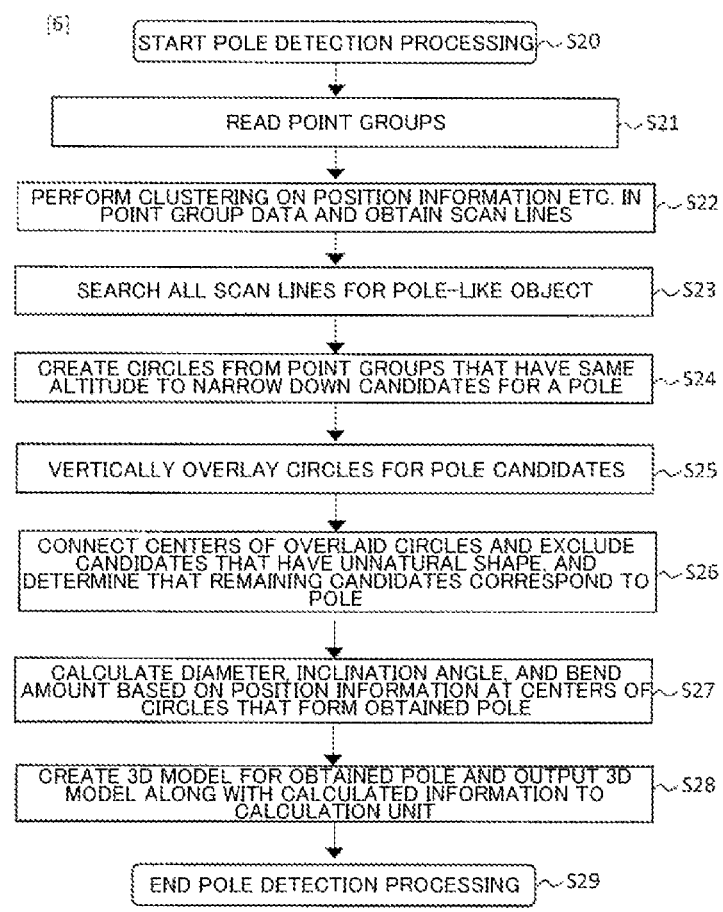
FIG. 6 is a flowchart illustrating pole 3D model creation processing performed by the extraction processing unit of the equipment state detecting device according to the present invention.

FIG. 6 is a flowchart illustrating processing performed in steps S11 and S12 in FIG. 5. The extraction processing unit 11 starts pole detection processing in step S20, and then extracts a 3D model of a pole and calculates central coordinates, a diameter, an inclination angle, a bend amount, and the like for the pole as described below. First, the extraction processing unit 11 reads point group data from the storage media 9 of the MMS 101 and the fixed laser scanner 102 (step S21). The extraction processing unit 11 then performs clustering on the position information and the like in the point group data and obtains scan lines (step S22), and searches all of the scan lines for a pole-like object (step S23). The extraction processing unit 11 then creates circles from point groups that have the same altitude to narrow down candidates for a pole (step S24), and vertically overlays the circles for the candidates (step S25). The extraction processing unit 11 then connects the centers of the overlaid circles, excludes candidates that have an unnatural shape, and determines that remaining candidates correspond to a pole (step S26). Note that "unnatural shape" refers to a shape that is not a circle or a circular arc. The extraction processing unit 11 then calculates a diameter, an inclination angle, and a bend amount based on position information at the centers of the circles that form the obtained pole (step S27). Lastly, the extraction processing unit 11 creates a 3D model for the obtained pole, and outputs the 3D model along with the calculated information to the calculation unit 12 (step S28).

Figure 7:
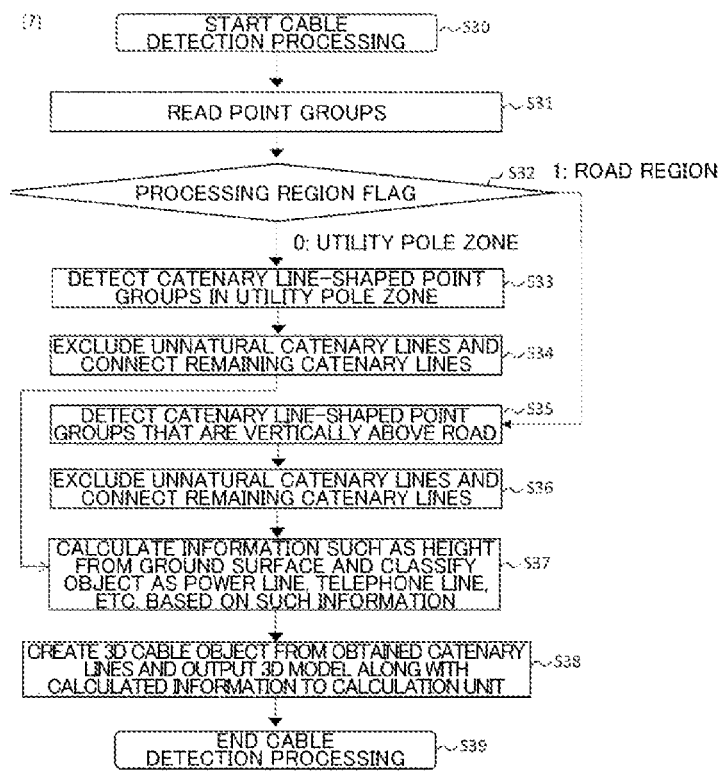
FIG. 7 is a flowchart illustrating cable 3D model creation processing performed by the extraction processing unit of the equipment state detecting device according to the present invention.

FIG. 7 is a flowchart illustrating processing performed in steps S13 and S14 in FIG. 5. The extraction processing unit 11 starts cable detection processing in step S30, and then extracts a 3D model of a cable as described below. First, the extraction processing unit 11 reads point group data from the storage media 9 of the MMS 101 and the fixed laser scanner 102 (step S31). For example, in the case where a pole is a utility pole or a signal post, the extraction processing unit 11 determines, based on position information or the like in the point group data, whether data pieces correspond to a position on a road (1: road region) or whether they do not (0: utility pole zone) (step S32). In the case of a utility pole zone, the extraction processing unit 11 detects catenary line-shaped point groups in the zone (step S33), excludes unnatural catenary lines, and connects the remaining catenary lines (step S34). Note that "unnatural catenary line" refers to a shape that has a singularity that has no continuity when connected to another catenary line. On the other hand, in the case of a road zone, the extraction processing unit 11 detects catenary line-shaped point groups that are vertically above the road (step S35), excludes unnatural catenary lines, and connects the remaining catenary lines (step S36). The extraction processing unit 11 then calculates information such as a height from the ground surface for the connected catenary lines, and classifies the object as a power line, a telephone line, or the like based on such information (step S37). Lastly, the extraction processing unit 11 creates a 3D cable object from the obtained catenary lines, and outputs the 3D model along with the calculated information to the calculation unit 12 (step S38).

Second Embodiment

Figure 8:
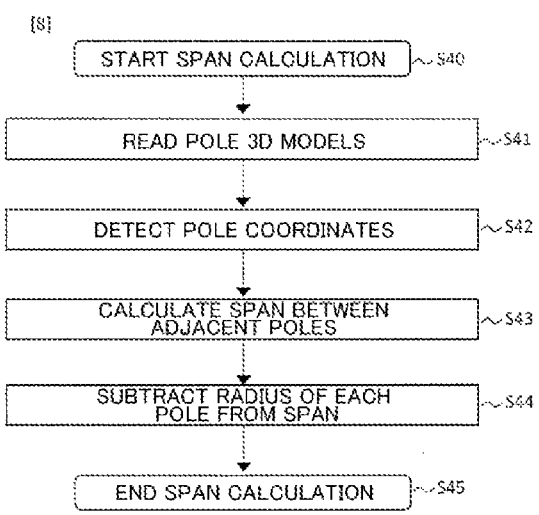
FIG. 8 is a flowchart illustrating inter-structure span calculation performed by a calculation unit of the equipment state detecting device according to the present invention.
Figure 9:
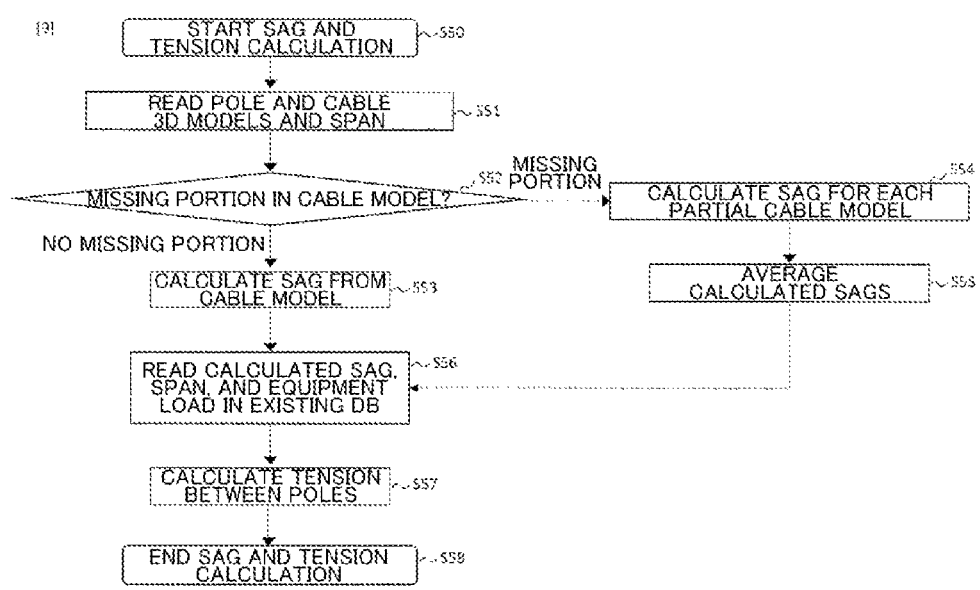
FIG. 9 is a flowchart illustrating cable sag and tension calculation performed by the calculation unit of the equipment state detecting device according to the present invention.

The present embodiment describes a method of quantitatively measuring a position, a bend amount, and an inclination angle of a pole such as a utility pole or a signal post, as well as a span and a cable sag and tension, with reference to FIGS. 8 and 9. FIG. 8 is a flowchart illustrating a method by which the calculation unit 12 calculates a span. FIG. 9 is a flowchart illustrating a method by which the calculation unit 12 calculates a sag and a tension.

As described in the first embodiment, the extraction processing unit 11 acquires point group data for outdoor structures using a 3D laser scanner in conjunction with GPS position information, converts the point group data into 3D models, and calculates positions, diameters, inclination angles, and bend amounts of poles based on such information.

The calculation unit 12 then calculates a span based on the pole 3D models and the calculated information, and calculates a sag and a tension based on an existing DB, the cable 3D models, and the calculated information. Specifically, the calculation unit 12 performs processing as described below.

This is processing for detecting central coordinates of a pair of 3D models of structures, calculating the distance between a pair of central coordinates that are at the same ground height, and calculating an inter-structure span S by subtracting the radius of each of the structures from the distance. Then, if the length of a 3D model of the cable is shorter than the inter-structure span S, for each non-parallel 3D model of the cable, the sag of a 3D model of the entirety of the cable is calculated based on the sag and the ratio between the span S' and the inter-structure span S. Then an average sag is obtained by averaging the sags of the 3D models of the complete cable calculated based on the non-parallel 3D models of the cable, and the average sag is set as the sag for use when calculating the tension of the cable.

Figure 10:
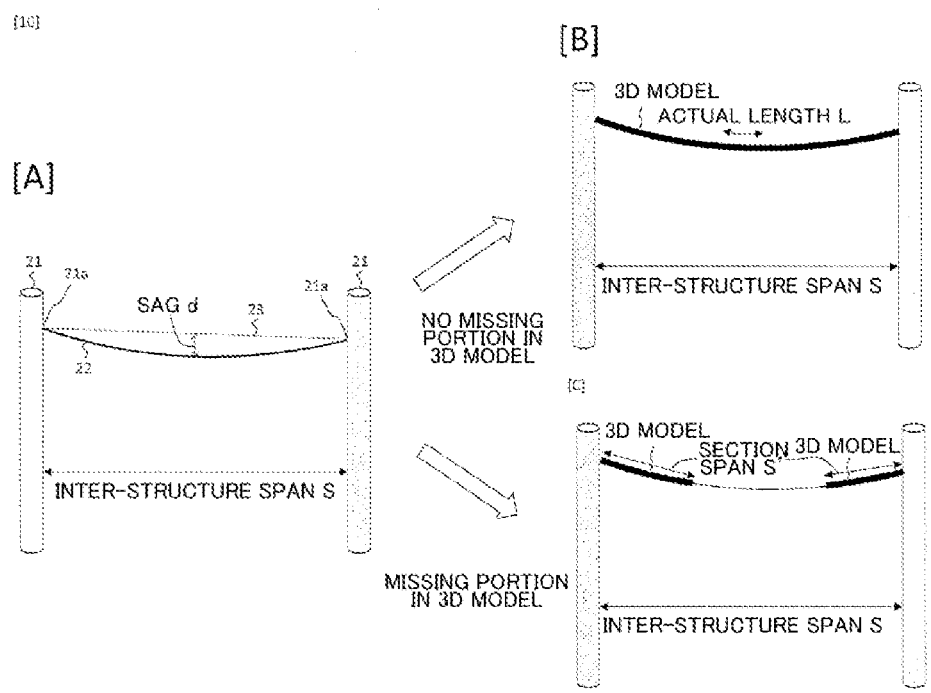
FIG. 10 is a diagram illustrating criteria used when the calculation unit of the equipment state detecting device according to the present invention determines whether or not a cable 3D model has a missing portion.
Figure 11:
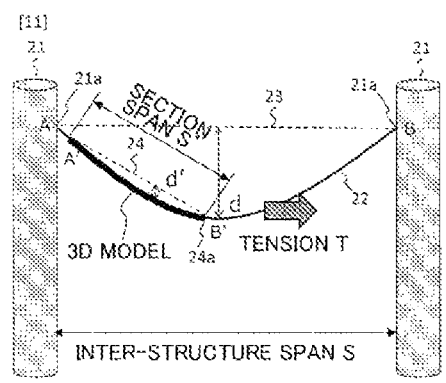
FIG. 11 is a diagram illustrating how the calculation unit of the equipment state detecting device according to the present invention calculates a sag from an incomplete cable 3D model.

The following describes definitions of the span S', the inter-structure span S, the sag d', the sag d, and an actual length L, with reference to FIGS. 10 and 11. FIG. 10(A) illustrates a power line 22 that spans two utility poles 21. The inter-structure span S is the distance between portions 21a where the power line 22 is connected to the surfaces of the utility poles 21. The sag d is the maximum distance between the power line 22 and a straight line 23 that connects the portions 21a of the utility poles 21. The actual length L is the actual length of the power line 22.

Because the 3D model is created from 3D point group data, the entirety of the power line 22 is sometimes not included in the 3D model depending on the data acquisition state of the laser scanner. FIG. 10(B) shows the case where the entirety of the power line 22 has been 3D modeled, and FIG. 10(C) shows the case where the entirety of the power line 22 has not been 3D modeled. In the case shown in FIG. 10(C), the span and the sag are the span S' and the sag d' as shown in FIG. 11.

FIG. 8 is a flowchart illustrating a method by which the calculation unit 12 calculates the inter-structure span S. The calculation unit 12 starts span calculation in step S40, and then reads out pole 3D models from the extraction processing unit 11 (step S41). Next, the calculation unit 12 detects central coordinates from the ground surface to the top of each pole based on the 3D models of the poles (step S42), and calculates the distance between adjacent poles (step S43). Then, using pole central coordinates that are at the same height from the ground surface, the calculation unit 12 calculates the inter-structure span S by subtracting the radius of each pole from the distance between the central coordinates (step S44).

FIG. 9 is a flowchart illustrating a method by which the calculation unit 12 calculates the sag (d or d') and a tension T. The calculation unit 12 starts sag and tension calculation in step S50, and then reads out pole and cable 3D models from the extraction processing unit 11, and also read outs the structure span S that was calculated using the procedure shown in FIG. 8 (step S51). Next, the calculation unit 12 compares the pole and cable 3D models with the inter-structure span S, and determines whether or not a cable 3D model is missing between the poles (step S52). For example, as shown in FIG. 10, in the case of poles having an inter-structure span S of 30 m, the actual length L of a cable 3D model detected between the poles is generally in the range of 30 meters to 30 and several meters. If the length of the cable 3D model is below this range, it is determined that a portion is missing in the 3D model. In view of this, the calculation unit 12 calculates a cable 3D model length Lm from the three-dimensional coordinates of the 3D point group data, compares the length Lm and the inter-structure span S, and determines whether a portion is missing in the cable 3D model using the following expressions.

(Determination Expressions)

If $Lm > S+\alpha$, no missing portion

If $Lm \leq S+\alpha$, missing portion

Note that α is a value approximately 10% of S, and can be set as desired by the worker.

If it is determined in step S52 that the 3D model does not have a missing portion, the calculation unit 12 calculates the sag d using the inter-structure span S (step S53). Specifically, the calculation unit 12 calculates the sag d by obtaining the maximum distance among distances between points of the cable 3D model and the straight line 23 that connects the ends 21*a* of the cable 3D model (see FIG. 11).

On the other hand, if it is determined in step S52 that a portion is missing in the 3D model, the calculation unit 12 calculates the sag d' using a cable 3D model detected between the poles (step S54). Specifically, the calculation unit 12 calculates the sag d' by obtaining the maximum distance among distances between points of the cable 3D model and a straight line 24 that connects one 21*a* and another end 24*a* of the cable 3D model (these distances are not in a direction perpendicular to the straight line 24, but rather in a direction perpendicular to the straight line 23) (see FIG. 11). If there are multiple cable 3D models, the calculation unit 12 calculates the sag d' for each 3D model. If there are multiple cable 3D models, there are also cases where there are parallel 3D models. In view of this, the calculation unit 12 uses the three-dimensional coordinates in the 3D point group data to determine whether the 3D models are 3D models of parallel power lines or partial 3D models of a single power line. Upon determining that the 3D models are partial 3D models of a single power line, the calculation unit 12 calculates the average value of the sags d' of the cable 3D models (step S55).

Next, the calculation unit 12 calculates the tension T in steps S56 and S57. In step S52, if it was determined that the cable model does not have a missing portion, the calculation unit 12 calculates the tension T by substituting the inter-structure span S, the sag d, and a cable load per unit length w held in an existing equipment DB (hereinafter, called the existing DB) into Expression 1.

However, if it was determined in step S52 that the cable model has a missing portion, the calculation unit 12 calculates the tension T as described below. The following description references FIG. 11. The tension of a cable existing in a still state between two poles is always the same in any section of the cable. For example, if the tension is not the same in each of an A-B section, an A'-B' section, an A-A' section, and a B'-B section, the cable is not in a still state, that is to say is oscillating. Accordingly, if the cable is in a still state, the same value is obtained when calculating the tension T regardless of which section of the 3D model the sag d' is from. Accordingly, letting W be the cable load per unit length, when using the span and the sag in the AB section as the inter-structure span S and the sag d, and when using the span and the sag in the A'-B' section as S' and d', the tension is the same in both cases, thus obtaining the following expression.

[Math. 2]

$$T = \frac{WS^2}{8d} = \frac{WS'^2}{8d'} \quad (2)$$

This can be transformed to the following expression.

[Math. 3]

$$d = d' \cdot \frac{S^2}{S'^2} \quad (3)$$

Accordingly, it is understood that the sag d of the cable in all sections between the utility poles is a numerical value obtained by multiplying the sag d' of a partial section by the ratio of the span S' and the inter-structure span S. Accordingly, even in the case of a cable model that is not a complete 3D model, the calculation unit 12 can acquire the sag d', the span S', and the inter-structure span S from the cable model for a partial section and estimate the sag d for all sections of the cable, and thus can estimate the tension T of the entirety of the cable.

Specific Examples

Figure 12:
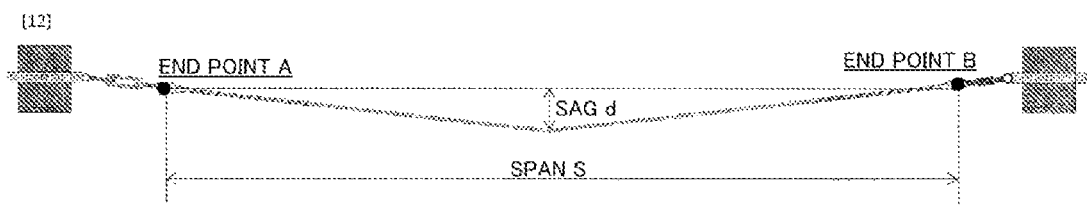
FIG. 12 is a diagram illustrating an example of measurement performed by the equipment state detecting device according to the present invention.

FIG. 12 is a diagram showing an experimental system for checking the above-described method for estimating the sag for all sections based on the sag in a partial section between utility poles. The span of the A-B section (corresponding to the inter-structure span S) was approximately 9.80 m, and the actual length L of the hung cable was approximately 9.82 m. The sag d in this case was measured using a laser measuring instrument and found to be approximately 23.53 cm. Next, for an arbitrary A'-B' section, the span S' was approximately 4.88 m, and the actual length Lm of the hung cable was approximately 9.82 m. The sag d' in this case was measured using a laser measuring instrument and found to be approximately 6.20 cm. When the measured sag was multiplied by the ratio of the spans in the A-B section and the A'-B' section ($S^2/S'^2$), the sag in all sections estimated from the partial section was approximately 24.96 cm. Given that the previously-described sag in the full section A-B was approximately 23.53 cm, the difference was approximately 1.43 cm. Similarly, the sag of the remaining section (the section excluding the partial section A'-B' from the full section A-B) was approximately 5.90 cm, and the sag for the full section based on the remaining section was approximately 23.45 cm. The difference was approximately 0.08 cm.

Letting d be the sag estimated from the partial section, S be the span of the AB section, and W be the cable load per unit length, the tension can be estimated from Expression 1.

Moreover, when the inter-structure span S is calculated from pole 3D models, if the lengths measured or estimated at the heights where the cables are hung are used instead of using the ground surface and the top, the influences of pole tilting and bending are eliminated.

Third Embodiment

Figure 13:
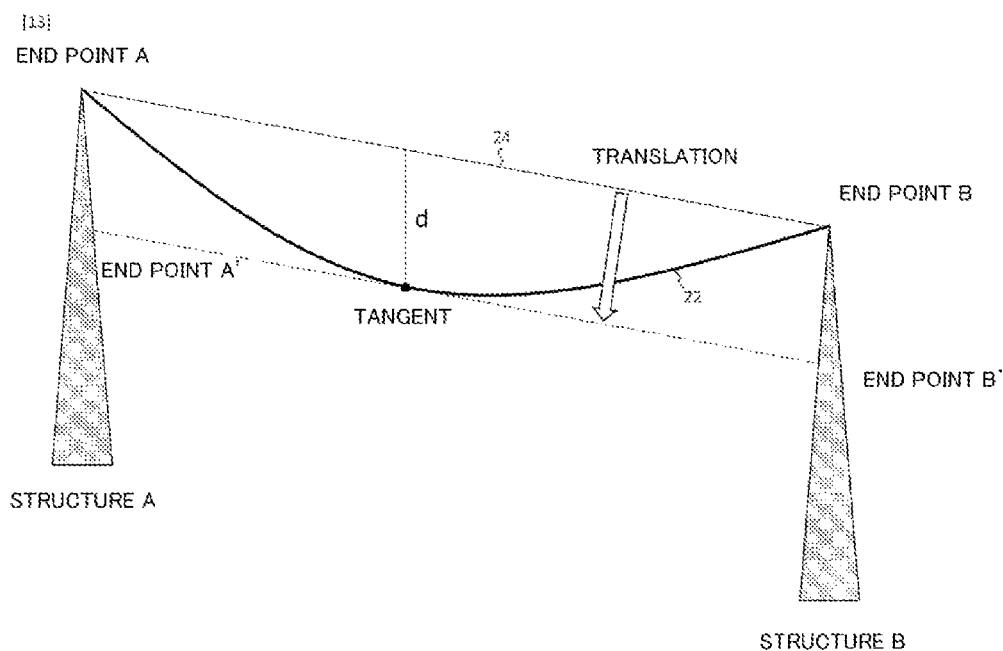
FIG. 13 is a diagram illustrating a definition of sag.
Figure 14:
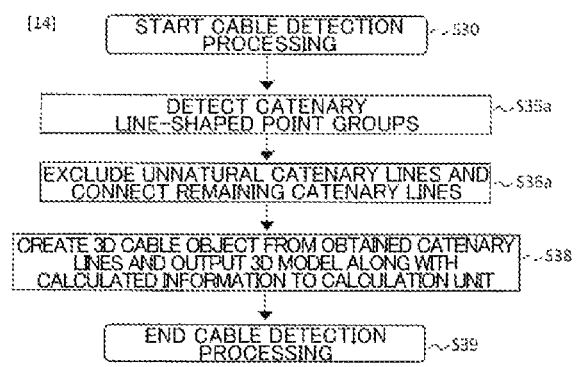
FIG. 14 is a flowchart illustrating cable 3D model creation processing performed by the extraction processing unit of the equipment state detecting device according to the present invention.

Cable tension is inspected for not only power lines that span utility poles, but also sometimes high-voltage lines that span non-pole-like steel towers (e.g., see FIG. 13). In FIG. 13, a cable 22 is a high-voltage line, and structures A and B are steel towers. In the case shown in FIG. 13, there are no pole-like utility poles, and the tension cannot be calculated using the methods describes in the first and second embodiments. In view of this, the present embodiment describes an example of quantitatively measuring the span, the sag, and the tension of a power line (cable) without creating 3D models of utility poles from point group data. As shown in FIG. 12, coordinates between end points A and B of the cable are acquired from point group data acquired by a 3D laser scanner in conjunction with GPS position information. The extraction processing unit 11 shown in FIG. 4 uses the point group to create a 3D model of the cable in accordance with the flowchart shown in FIG. 14. The extraction processing unit 11 starts cable detection processing in step S30. First, the extraction processing unit 11 reads point group data from the storage media 9 of the MMS 101 and the fixed laser scanner 102, and extracts catenary line-shaped point groups from the point group data (step S35*a*). The extraction processing unit 11 then excludes unnatural catenary lines, and connects the remaining catenary lines (step S36*a*). Lastly, the extraction processing unit 11 creates a 3D cable object from the obtained catenary lines, and outputs the 3D model along with the calculated information to the calculation unit 12 (step S38).

Figure 15:
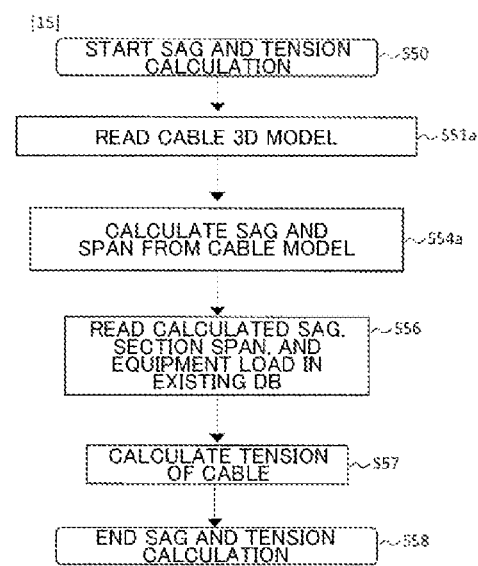
FIG. 15 is a flowchart illustrating cable sag and tension calculation performed by the calculation unit of the equipment state detecting device according to the present invention.

Subsequently, the calculation unit 12 uses the cable 3D model to calculate the sag and the tension in accordance with the flowchart shown in FIG. 15. The calculation unit 12 starts sag and tension calculation in step S50, and then reads out pole and cable 3D models from the extraction processing unit 11 (step S51*a*). Next, the calculation unit 12 calculates the sag and the span based on the cable 3D model (step S54*a*). Here, the calculation unit 12 translates a straight line 24 that connects the end points A and B, and calculates the sag d using the coordinates of the lowest point of contact with the cable 22 (see FIG. 13). Note that if the entirety of the cable has not be 3D modeled, the sag d' can be similarly calculated using the coordinates of the two ends of a 3D model. Also, the inter-structure span S or the section span S' is the length of the straight line 24. Next, the calculation unit 12 calculates the tension T in steps S56 and S57. The calculation unit 12 calculates the tension T by substituting the inter-structure span S or the section span S', the sag d or d', and a cable load per unit length w held in an existing DB into Expression 2.

Fourth Embodiment

The present embodiment describes a method of converting point group data of a outdoor structure into a 3D model and precisely estimating the position, the bend amount, and the inclination angle of a pole such as a utility pole or a signal post, as well as a span, a sag, and a tension.

The point group data includes coordinates acquired in conjunction with GPS position information, but it is common for large errors to occur if the number of GPS satellites used in calculation is low. Additionally, if the point group data is acquired by a moving body in an MMS or the like, an inertial measuring device called an IMU is provided to measure angles for three axes and angular velocity, and such data is used to improve position accuracy. However, it is common for errors to occur if the device operates during sudden braking, sudden acceleration, or the like of the moving body.

Accordingly, the position accuracy in the acquired 3D point group data is sometimes dependent on the traveling velocity and vehicle orientation, and is not uniform. This similarly applies for poles or the like and cables as well, and even in the case of the same pole or cable, the position accuracy of the acquired 3D point group data changes depending on the situation. In view of this, in the present embodiment, the position accuracy of the 3D point group data is estimated based on the used number of GPS satellites and amounts of change in acceleration or the like acquired by the IMU, for example.

For example, even with the cable 3D model not having a missing portion shown in FIG. 10, if the 3D model is created based on pieces of 3D point group data that have various position accuracies, three-dimensional coordinates that have low precision will also be used in 3D modelling. On the other hand, with a cable 3D model having a missing portion shown in FIG. 10, if the 3D model is created based on pieces of 3D point group data that all have a high position accuracy, the sag and the tension can be calculated with a higher precision than in the case of a complete cable 3D model created based on pieces of 3D point group data that have various position accuracies as described above.

In view of this, if at least either one of the two following types of information, which are received along with the 3D point group data, does not satisfy a pre-set control value, the extraction processing unit 11 does not use the three-dimensional coordinates that did not satisfy the control value when creating the 3D model. The first information is the number of artificial satellites that were used when acquiring the three-dimensional coordinates. The second information is information regarding the speed (acceleration and velocity) of the measuring device during acquisition of the three-dimensional coordinates. In this technique, for example, a cable 3D model is created based on only 3D point group data for which the number of artificial satellites used is 3 or higher, the MMS velocity is 40 km/h or lower, and the MMS acceleration is 3 m/s$^2$ or lower. Selecting 3D point group data in this way makes it possible to precisely calculate the sag and the tension.

Supplementary Notes

The following describes an equipment state detecting device according to an embodiment of the present invention.

(1) The equipment state detecting device is a device for detecting a position, a diameter, an inclination angle, and a bend amount of a pole and a minimum ground height of a cable based on data indicating a 3D model of an outdoor structure created with use of 3D point group data indicating three-dimensional coordinate of points on surfaces of the outdoor structure acquired using a laser scanner.

(2) The equipment state detecting device also has a function for detecting a span between two adjacent poles based on pole 3D model data that was created and position information.

(3) The equipment state detecting device also has a function for calculating the tension acting between the poles using cable position information and an inter-pole span or a span between a pole and an exterior wall of a house or the like.

(4) The equipment state detecting device also has a function for, if there is a missing portion in a partial section of cable information regarding a cable between poles or between a pole and an exterior wall of a house or the like, estimating the sag using cable position information regarding a partial section other than the missing portion, and estimating the tension acting in all sections.

(5) The equipment state detecting device also has a function for, in the sag and tension measurement, giving consideration to the position accuracy of the 3D point group data, creating a 3D model from only point groups that have a high position accuracy, and estimating the sag and the tension acting in all sections based on the cable position information of a partial section.

The equipment state detecting device performs an extraction processing procedure (FIGS. 5 to 7) and a calculation procedure (FIGS. 8 and 9). Here, in the extraction processing procedure, 3D point group data including three-dimensional coordinate points that represent the surface of a cable spanning two structures is received as input, and a 3D model of the cable is created using the 3D point group data. Also, in the calculation procedure, a span indicating the length of a straight line that connects the two ends of the cable 3D model is acquired, a sag indicating the maximum distance among distances between the straight line and points of the cable 3D model is acquired, and the tension of the cable is calculated based on the span, the sag, and a known cable load per unit length.

Effects

According to the present disclosure, if it is possible to acquire three-dimensional coordinates of a piece of outdoor equipment using an MMS or the like that includes a laser scanner, and to create a 3D model of even a portion of an actual cable, it is then possible to estimate the tension acting on the cable. Accordingly, it is possible to visualize the tension acting between utility poles or between a utility pole and a user's house, and it is possible to visualize the total load acting on a pole by also adding the loads of other attachments or the like. Accordingly, a pole having a high possibility of danger (a high unbalanced load) can be extracted without all poles being inspected by an inspector with a high level of experience with cables, and it is also possible to reduce the workload for actually going to equipment locations.

Also, when creating a 3D model of a cable, in the case of filling in a missing point group by interpolation, the amount of error increases if point group that has noise or error is used in interpolation. In order to prevent this, by estimating the equipment state based on only point groups that have a high precision based on the position accuracy of the point groups, it is possible to estimate the equipment state with higher precision than when using another technique.

Additionally, if a portion having an unbalanced load can be resolved, it is possible to greatly extend the lifetime of poles.

REFERENCE SIGNS LIST 1 3D laser scanner
2 GPS (Global Positioning System)
3 IMU (Inertial Measurement Unit)
5 Utility pole (pole)
6 Power line (cable)
7 Closure
8 Tripod
9 Storage medium
11 Extraction processing unit
12 Calculation unit
21 Pole (utility pole)
21a Portion
22 Power line (cable)
23 Straight line
24 Straight line
101 MMS (Mobile Mapping System)
102 Fixed laser scanner
301 Equipment state detecting device

The invention claimed is:

1. An equipment state detecting device comprising:
a processor; and
a storage medium having computer program instructions stored thereon, which when executed by the processor, perform to:

receive 3D point group data including three dimensional coordinate points that represent a surface of a cable spanning two structures;
create a 3D model of the cable using the 3D point group data;
acquire a span indicating length of a straight line that connects two ends of the 3D model of the cable;
acquire a sag indicating a movement amount when translating the straight line until the straight line is in contact with the 3D model of the cable at one point; and
calculate a tension of the cable based on the span, the sag, and a known cable load per unit length;
receive 3D point group data including three-dimensional coordinate points that represent surfaces of the structures;
create 3D models of the structures using the 3D point group data;
acquire state information regarding a diameter, an inclination angle, and a bend amount for each of the structures; and
determine if the calculated tension of the cable exceeded design tension of the structures for a specified period of time, and if so, indicate that there is a risk that cracks will form in the structures, the lifetime of the structures will decrease, or any of the structures may fall over in a worst case.

2. An equipment state detecting device comprising:
a processor; and
a storage medium having computer program instructions stored thereon, which when executed by the processor, perform to:

receive 3D point group data including three dimensional coordinate points that represent a surface of a cable spanning two structures;
create a 3D model of the cable using the 3D point group data;
acquire a span indicating length of a straight line that connects two ends of the 3D model of the cable,
acquire a sag indicating a movement amount when translating the straight line until the straight line is in contact with the 3D model of the cable at one point, and
calculate a tension of the cable based on the span, the sag, and a known cable load per unit length;
detect central coordinates in the 3D model of each of the structures;
calculate a distance between the central coordinates at the same ground height,
calculate an inter-structure span by subtracting a radius of each of the structure from the calculated distance;
if length of a 3D model of the cable is shorter than the inter-structure span, for each non-parallel 3D model of the cable, calculate a sag of a complete 3D model of the cable based on a ratio of the span and the inter-structure span,
obtain an average sag by averaging the sags of the complete 3D models calculated for the non-parallel 3D models of the cable, and use the average sag as the sag when calculating the tension of the cable; and
determine if the calculated tension of the cable exceeded design tension of the structures for a specified period of time, and if so, indicate that there is a risk that cracks will form in the structures, the lifetime of the structures will decrease, or any of the structures may fall over in a worst case.

3. An equipment state detecting device comprising:
a processor; and
a storage medium having computer program instructions stored thereon, which when executed by the processor, perform to:
receive 3D point group data including three dimensional coordinate points that represent a surface of a cable spanning two structures;
create a 3D model of the cable using the 3D point group data;
acquire a span indicating length of a straight line that connects two ends of the 3D model of the cable;
acquire a sag indicating a movement amount when translating the straight line until the straight line is in contact with the 3D model of the cable at one point; and
calculate a tension of the cable based on the span, the sag, and a known cable load per unit length;
receive the number of artificial satellites used when acquiring three-dimensional coordinates and information regarding a velocity of a measuring device during acquisition of three-dimensional coordinates along with the 3D point group data; and
if at least either one of the number of artificial satellites and the velocity do not satisfy a pre-set control value, do not use the three-dimensional coordinates that did not satisfy the control value when creating the 3D model; and
determine if the calculated tension of the cable exceeded design tension of the structures for a specified period of time, and if so, indicate that there is a risk that cracks will form in the structures, the lifetime of the structures will decrease, or any of the structures may fall over in a worst case.

4. An equipment state detecting method comprising:
receiving 3D point group data including three dimensional coordinate points that represent a surface of a cable spanning two structures;
creating a 3D model of the cable using the 3D point group data;
acquiring a span indicating length of a straight line that connects two ends of the 3D model of the cable;
acquiring a sag indicating a movement amount when translating the straight line until the straight line is in contact with the 3D model of the cable at one point; and
calculating a tension of the cable based on the span, the sag, and a known cable load per unit length;
receiving 3D point group data including three-dimensional coordinate points that represent surfaces of the structures;
creating 3D models of the structures using the 3D point group data;
acquiring state information regarding a diameter, an inclination angle, and a bend amount for each of the structures;
extracting a 3D model of each of the two structures based on one of the inclination angle or the bend angle for that structure; and
determine if the calculated tension of the cable exceeded design tension of the structures for a specified period of time, and if so, indicate that there is a risk that cracks will form in the structures, the lifetime of the structures will decrease, or any of the structures may fall over in a worst case.

* * * * *